United States Patent
Ramalingam et al.

(10) Patent No.: US 9,292,336 B1
(45) Date of Patent: Mar. 22, 2016

(54) SYSTEMS AND METHODS PROVIDING OPTIMIZATION DATA

(71) Applicant: AMAZON TECHNOLOGIES, INC., Reno, NV (US)

(72) Inventors: Harsha Ramalingam, Kirkland, WA (US); Manoj Bhagwan Jadhav, Hyderabad (IN); Srinivasa Susheel Kumar Mannepalli, Redmond, WA (US); Scott Cameron Webster, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 114 days.

(21) Appl. No.: 14/161,412

(22) Filed: Jan. 22, 2014

(51) Int. Cl.
*G06F 9/46* (2006.01)
*G06F 9/44* (2006.01)
*G06F 9/54* (2006.01)

(52) U.S. Cl.
CPC ............... *G06F 9/466* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 5,761,477 A * | 6/1998 | Wahbe | ................ | G06F 11/3624 717/131 |
| 5,896,538 A * | 4/1999 | Blandy | ............... | G06F 11/3409 717/127 |
| 6,574,587 B2 * | 6/2003 | Waclawski | .................... | 702/186 |
| 6,690,676 B1 * | 2/2004 | Gulick | .................... | G06F 13/14 718/101 |
| 7,058,622 B1 * | 6/2006 | Tedesco | | |
| 7,117,184 B1 * | 10/2006 | Fontana | ................ | G06F 9/5083 718/101 |
| 7,716,335 B2 * | 5/2010 | Dinker et al. | ................. | 709/226 |
| 7,870,431 B2 * | 1/2011 | Cirne | .................. | G06F 11/3624 717/131 |
| 8,041,808 B1 * | 10/2011 | Becker | .......................... | 709/224 |
| 8,041,901 B2 * | 10/2011 | Snyder | ................ | G06F 11/3466 717/127 |
| 8,095,741 B2 * | 1/2012 | Heller, Jr. | ........... | G06F 11/1474 718/101 |
| 8,140,911 B2 * | 3/2012 | Borghetti et al. | ............... | 714/45 |
| 8,327,358 B2 * | 12/2012 | Mangione-Smith | .. | G06F 9/5077 717/127 |
| 8,417,811 B1 | 4/2013 | Jenkins et al. | | |
| 8,453,129 B2 * | 5/2013 | Stephenson | ......... | G06F 9/45516 717/131 |
| 8,527,998 B2 * | 9/2013 | Cho | ...................... | G06F 9/4881 718/101 |
| 8,626,897 B2 * | 1/2014 | Guo et al. | ...................... | 709/224 |
| 8,712,950 B2 * | 4/2014 | Smith et al. | ...................... | 706/52 |
| 8,762,367 B2 * | 6/2014 | Burger et al. | .................. | 707/718 |
| 8,813,063 B2 * | 8/2014 | Uthe | ......................... | G06F 8/61 717/131 |
| 2002/0116441 A1 * | 8/2002 | Ding | .................... | G06F 9/5011 718/101 |

(Continued)

OTHER PUBLICATIONS

Meeuws, et al, "Quipu: A Statistical Model for Predicting Hardware Resources"; 2013 ACM; [retrieved on Nov. 19, 2015]; Retrieved from Internet <URL:http://dl.acm.org/citation.cfm?id=2457443. 2457446>;pp. 3:1-3:25.*

(Continued)

*Primary Examiner* — Xi D Chen
(74) *Attorney, Agent, or Firm* — Lindauer Law, PLLC

(57) ABSTRACT

Service fleets made up of many pieces of computer hardware may perform computational tasks. Described herein are systems and methods for optimizing costs associated with the computer hardware. In one example, an optimization system indicates an amount of hardware needed such that the service fleet operates at an optimal cost. The amount of hardware may be determined based on hardware cost metric data generated for a service fleet.

20 Claims, 9 Drawing Sheets

(56) References Cited

U.S. PATENT DOCUMENTS

| | | | |
|---|---|---|---|
| 2002/0170038 A1* | 11/2002 | Yeh | G06F 11/3428 717/131 |
| 2005/0027661 A1* | 2/2005 | Lober et al. | 705/400 |
| 2005/0155019 A1* | 7/2005 | Levine | G06F 11/3636 717/127 |
| 2006/0013134 A1* | 1/2006 | Neuse | 370/230 |
| 2007/0226697 A1* | 9/2007 | Barsness | G06F 11/3612 717/127 |
| 2007/0271203 A1* | 11/2007 | Delvat | 705/400 |
| 2012/0123739 A1* | 5/2012 | Sethumadhavan et al. | 702/186 |
| 2012/0290348 A1* | 11/2012 | Hackett et al. | 705/7.13 |
| 2014/0282536 A1* | 9/2014 | Dave et al. | 718/1 |
| 2014/0310249 A1* | 10/2014 | Kowalski | 707/688 |
| 2015/0095089 A1* | 4/2015 | Ginis et al. | 705/7.22 |

OTHER PUBLICATIONS

Koehler, et al., "Platform-Aware Bottleneck Detection for Reconfigurable Computing Applications"; 2011 ACM; [retrieved on Nov. 19, 2015]; Retrieved from Internet <URL:http://http://dl.acm.org/citation.cfm?id=2000832.2000842>;pp. 30:1-30:28.*

Wilkes, et al., "The HP AutoAID Hierarchical Storage System", 1996 ACM; [retrieved on Nov. 19, 2015]; Retrieved from Internet <URL:http://ieeexplore.ieee.org/xpl/ebooks/bookPdfWithBanner.jsp?fileName=5264167.pdf&bkn=5263068&pdfType=chapter&tag=1>;pp. 90-106.*

Toender, et al., "Optimal Channel Code Parameter Selection for Hardware Efficient OFDM Systems"; 2004 IEEE;[retrieved on Nov. 19, 2015]; Retrieved from Internet <URL:http://ieeexplore.ieee.org/stamp/stamp.jsp?tp=&arnumber=1400065>;pp. 538-542.*

\* cited by examiner

SYSTEMS AND METHODS PROVIDING OPTIMIZATION DATA

BACKGROUND

Computing devices may request services executing on other computing devices to perform data processing tasks. Performing these data processing tasks consume hardware resources of the services. As the demand for the performance of data processing tasks changes, the amount of hardware resources needed to meet the demand changes. Because the demand for the performance of the data processing tasks changes, determining an efficient amount of hardware needed to meet the changing demand becomes challenging.

Figure 1:
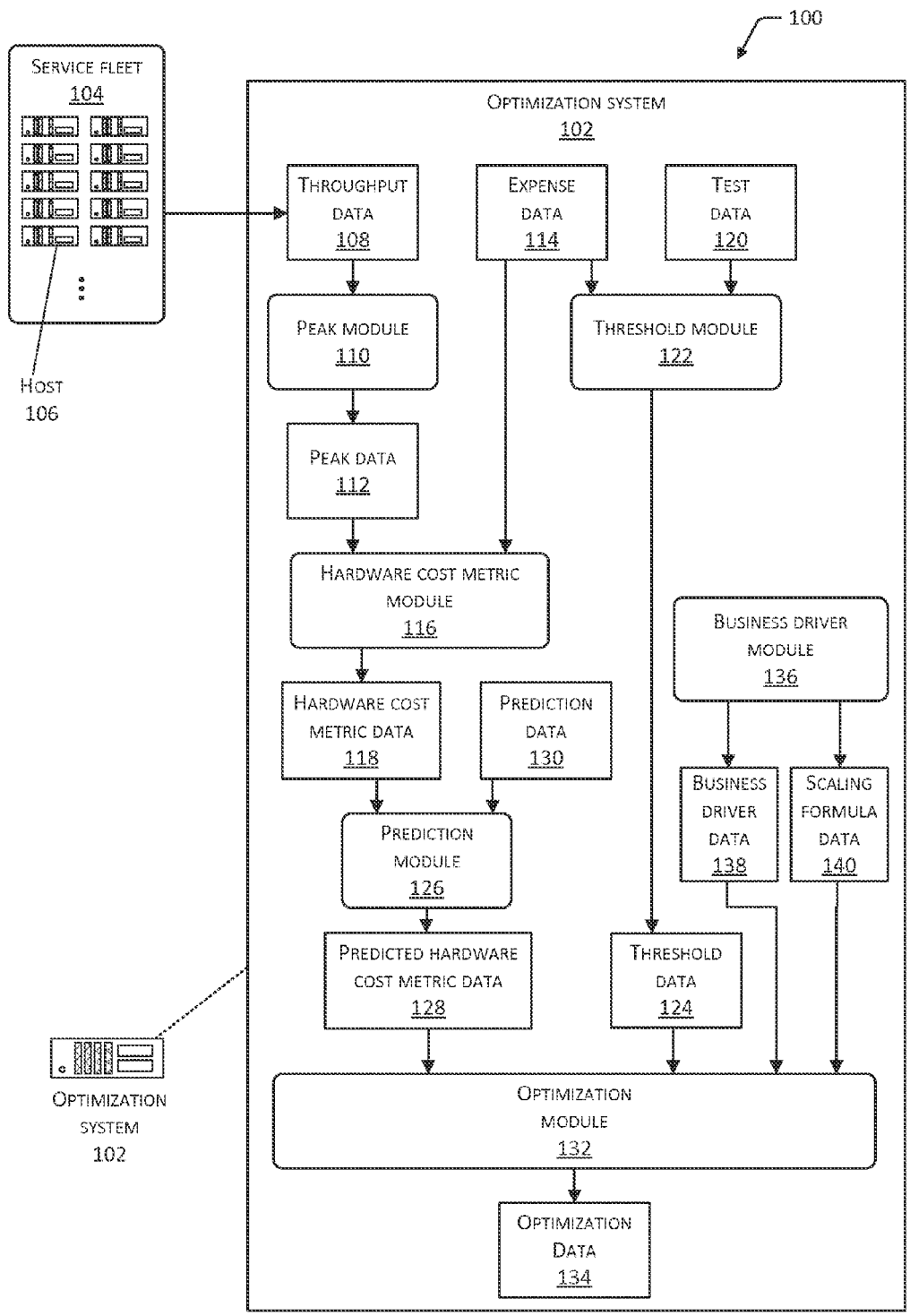
FIG. 1 is a block diagram of a system configured to generate optimization data based on hardware cost metric data that is generated based on expense data and peak data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for optimizing costs associated with computer hardware included in a service fleet. The service fleet may include a plurality of hosts comprising computing devices such as servers. The computing device may include the hardware which may comprise mechanical, magnetic, optical, and electrical devices, such as processors, storage devices, input/output ("I/O") interfaces, and so forth. The service fleet may perform services for other computing devices. The service may be a set of instructions that execute on the hardware to perform data processing tasks. For example, the service may calculate a value from inputs, retrieve information from a datastore, and so forth. Demand for the performance of the service may change over time, resulting in a change in the amount of hardware needed to meet this changing demand. Typically, the higher the demand of performance of the services, the more hardware is needed to meet the higher demand. Because the amount of needed hardware changes over time, determining an optimal or cost effective amount of hardware becomes challenging. Too much hardware is expensive to procure and maintain. Not enough hardware leads to problems providing the service.

As described in more detail below, an optimization system may generate optimization data. The optimization system may comprise one or more computing devices, which can perform functions described in this disclosure. The optimization data may indicate an amount of hardware that, if implemented, would cause the service to operate in a more cost effective manner. The cost effective manner may be described as being economical or efficient in terms of services received from money spent. For example, when the service fleet includes a plurality of removable hardware pieces which are capable of processing up to 5,000 transactions per day, it may be the most cost effective for the removable hardware pieces to process 5,000 transactions per day. If the service fleet was only processing 1,000 transactions per day, it may be more cost effective to remove some of the pieces of hardware, and use them in another service fleet which may need them to process its own transactions.

To generate the optimization data, the optimization system generates hardware cost metric data representative of a cost associated with the performance of the hardware. The performance of the hardware may be described as the quantity of transactions that are processed by the service fleet compared to amount of hardware resources used. The cost may be expressed as a dimensionless scaled number having values, for example, between 1 and 1000. The generation of the hardware cost metric data is discussed in more detail below.

The hardware cost metric data may be generated based on throughput data. The throughput data may indicate quantities of processed transactions occurring over an amount or period of time. For example, the throughput data may indicate that 3,000 transactions were processed on Wednesday, 4,000 transactions were processed on Thursday, and 10,000 transactions were processed on Friday. The transaction may comprise a request for performance of a data processing task. For example, the transaction may comprise a request to calculate a value from inputs, a request to retrieve information from a datastore, and so forth. In some implementations, the transactions are implemented as application programming interface ("API") calls.

The optimization system may generate the throughput data based on log data comprising information about activities performed by one or more hosts of the service fleet. For example, when the service fleet performs a data processing task, the service fleet may generate log data indicating that a transaction has been processed. The log data may also include various other information, such as the time that the transaction was processed, the name of the host that processed the transaction, and so forth. The log data may be stored in a log file which may include data comprising a collection of information about occurrences and times of previously processed transactions. By analyzing the information in the log file, the optimization system may generate the throughput data.

In some implementations, the optimization system generates the hardware cost metric data based on peak data. The peak data may indicate a peak quantity of processed transactions occurring over a designated amount or period of time. For example, if the designated period of time is one week, an analysis of the throughput data for the last week may indicate the following number of processed transactions as shown in Table 1:

TABLE 1

| Day | Number of Processed Transactions |
| --- | --- |
| Sunday | 2,000 |
| Monday | 2,000 |
| Tuesday | 2,000 |
| Wednesday | 3,000 |
| Thursday | 4,000 |
| Friday | 10,000 |
| Saturday | 9,000 |

In this example, the peak quantity of processed transactions is 10,000. Accordingly, the optimization system may generate peak data indicating a peak quantity of 10,000 processed transactions occurring over the last week.

In some implementations, the optimization system generates the hardware cost metric data based on expense data. The expense data may indicate an expense associated with the hardware. The expense may be described as the total cost of ownership for the installed hardware for the service. A datastore may be configured to store information about prices related to individual pieces of hardware that comprise the service fleet. In one example, the prices related to the hardware include prices such as a purchase price, a lease price, or a rental price. The price information may be entered by a user via a user interface of the optimization system. The optimization system may be configured to access the pricing information from the datastore.

In some implementations, the optimization system generates the hardware cost metric data based on the expense data and the peak data. The optimization system may generate the hardware cost metric data by dividing the expense associated with the hardware by the peak quantity of processed transactions occurring over a period of time. In one example, the expense data indicates an expense of $2,000.00 associated with the hardware. The peak data indicates a peak quantity of 400 transactions per second occurring over the last week. The optimization system may divide the $2,000.00 expense by the 400 transactions, resulting in the hardware cost metric data having a value of 5. The value of 5 represents a cost associated with the hardware's performance of processing transactions compared to the amount of cost of the hardware.

In some implementations, the optimization system generates the optimization data based on predicted hardware cost metric data. The predicted hardware cost metric data may comprise a predicted cost associated with the performance of the hardware. The predicted cost may be expressed as a scaled number having values, for example, between 1 and 1000. The generation of the predicted hardware cost metric data is discussed in more detail below.

The optimization system may generate the optimization data based on threshold data. The threshold data may indicate an optimal cost associated with the performance of the hardware. The optimal cost may be expressed as a scaled number having values, for example, between 1 and 1000. When an analysis of the hardware indicates that the cost associated with the performance of the hardware is at the optimal cost, the hardware may be described as performing at an optimum level. Performing at the optimum level may be described as the hardware running in a most efficient manner or cost effective manner. Generally, when the hardware is running at the optimal level, hardware does not need to be added or removed from the service fleet, because doing so would cause too much hardware to be used than is necessary to process the transactions, or too little hardware to process the transactions. As described in more detail below, the optimal cost may be determined based on providing redundancy. That is, the service fleet is configured to include spare hardware capacity for handling transactions if other hardware of the service fleet fails.

The optimization system may generate the threshold data based on test data. The test data may comprise sample quantities of transactions which may run against the service fleet. Using the test data, the optimization system may execute benchmark tests. The benchmark tests may be executed periodically based on the sample periods of time indicated by the test data. The benchmark may run a number of tests against the hardware. In some implementations, the benchmark test is configured to determine the maximum amount of transactions the hardware may process before certain predetermined metrics reach a certain predetermined threshold capacity. For example, the predetermined metrics may relate to processor capacity utilization, memory capacity utilization, and input/output operations per second ("IOPS") utilization. In this example, the metrics may be expressed as percentages, and the predetermined threshold capacity may comprise the value 53.4%. The threshold capacity value may be determined based on various information. For example, the threshold capacity value may be determined based on a determination of a saturation point of a service fleet and based on being able to handle a sudden increase in demand due to system failures. For example, the saturation point for any given service fleet may be 80%. The saturation point may be described as a point at which the service fleet starts to run inefficiently. The given service fleet may execute across three data centers to provide redundancy. This configuration allows for two of the service fleets to handle the transactions if one of the service fleets fail. The 53.4% may be calculated by multiplying 66.7% (to account for a possible service fleet failure) by the 80%.

As the sample number of transactions are increased, the metric values increase. When one of the metric values reaches 53.4%, the optimization system may determine the quantity of transactions that caused the metric value to reach the 53.4% by reading the quantity of transactions being input at the time the metric value reaches the 53.4% threshold capacity. The quantity of transactions being input at the time the 53.4% threshold capacity is met may be described as the optimum throughput. The optimum throughput indicates a saturation level associated with the hardware, indicating a maximum amount of transactions that can be processed by the hardware before a higher risk of overload occurs.

The optimization system may generate the threshold data based on the expense data and the test data. The optimization system may generate the threshold data by dividing the expense associated with the hardware by the optimum throughput indicated by the maximum amount of transactions that can be processed by the hardware before the predetermined capacity thresholds are met. For example, the expense data indicates an expense of $2,000.00 associated with the hardware. The optimum throughput indicates a quantity of 800 transactions per second occurring over one week. The optimization system may divide the $2,000.00 expense by the 800 transactions, resulting in an optimal cost associated with the performance of the hardware of $2.50.

The optimization system may generate the predicted hardware cost metric data based on prediction data. The prediction data may indicate a predicted quantity of transactions to be processed by the hardware. For example, the prediction data may indicate that a current quantity of transactions processed by the hardware is expected to grow 3% over the next three months.

The optimization system may generate the predicted data based on various information. For example, the optimization system may be configured to analyze the quantity of transactions previously processed to predict the quantity of future transactions. The analysis may indicate a consistent growth of 5% in each of the last three years, indicating that the next year's expected growth may be 5%. In another example, the predicted quantity of processed transactions may be based on an introduction of a new product. The new product may be expected to cause an increase in the quantity of future processed transactions. In another example, the predicted quantity of processed transactions may be based on a planned reduction in price for one or more products. The reduction in price may be expected to cause an increase in the quantity of future processed transactions.

The optimization system may generate the predicted hardware cost metric data based on the hardware cost metric data and the prediction data. For example, the hardware cost metric data may indicate a cost of $10.00 associated with particular hardware of a service fleet, and the prediction data may indicate an expected increase in processed transactions of 100% over the next year. Based on the expected growth information, the predicted hardware cost metric data may be indicative of values of the cost increasing at a rate of about $0.83 each month, resulting with a predicted cost of $20.00 after one year.

The optimization system may be configured to generate the optimization data based on the predicted hardware cost metric data and the threshold data. The optimization data may indicate an amount of hardware that, if implemented, would cause the service to operate in a cost effective manner. The amount of hardware indicated by the optimization data may change over time based on the predictions of the expected processed transactions. In one example, today the hardware cost metric data of a particular service fleet may indicate a cost of $20.00. The predicted hardware cost metric data indicates an expected cost of $21.00 one month from today, $24.00 two months from today, and $18.00 three months from today. The threshold data indicates an optimal cost of $18.00. The optimization system may calculate the amount of hardware needed for the service fleet to meet the optimal cost. The optimization system may provide the optimization data to a computing device executing an order processing service associated with a supplier of additional hardware. The supplier may provide additional hardware based on the information provided in the optimization data.

By generating the optimization data, the amount of hardware comprising the service fleet may be adjusted such that the service operates in a cost effective manner. By knowing the amount of hardware that causes the service fleet to operate in a cost effective manner, unnecessary orders of extra hardware for the service fleet may be reduced or eliminated.

Illustrative System

FIG. 1 is a block diagram of a system 100 configured to generate optimization data based on hardware cost metric data that is generated based on expense data and peak data. The system 100 includes an optimization system 102 and a service fleet 104. The optimization system 102 may comprise one or more computing devices, which can perform functions described in this disclosure. In some implementations, the optimization system 102 may be described as a server computing device.

The service fleet 104 may include one or more hosts 106 comprising computing devices such as servers. The one or more hosts 106 may include hardware which may comprise mechanical, magnetic, optical, and electrical devices, such as processors, storage devices, I/O interfaces, and so forth. The hosts 106 may be the same or similar in hardware, construction, components, modules, and so forth when compared to one another. In FIG. 1, the optimization system 102 is separate from the service fleet 104. In some implementations the optimization system 102 is included in the service fleet 104.

The service fleet 104 may be configured to perform services for other computing devices (not shown). The service may be a set of instructions that execute on the hardware to perform data processing tasks. For example, the service may calculate a value from inputs, retrieve information from a database, and so forth.

The optimization system 102 may be operatively connected to the service fleet 104 using one or more networks. The network facilitating communication between the optimization system 102 and the service fleet 104 may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi™ as promulgated by the Wi-Fi Alliance, 3G and 4G, Bluetooth® as promulgated by the Bluetooth Special Interest Group, and so forth. In some implementations, the devices and systems described herein are configured to directly connect to each other. The system 100 may include additional servers which communicate with the optimization system 102 and the service fleet 104.

In this implementation, the optimization system 102 accesses throughput data 108 comprising information about transactions that are processed by the service fleet 104. The throughput data 108 may indicate quantities of processed transactions occurring over a period of time. For example, the throughput data 108 may indicate that 36,000 transactions were processed in January, 48,000 transactions were processed in February, and 120,000 transactions were processed in March. The transaction may comprise a request for performance of a data processing task. For example, the transaction may comprise a request for the service fleet 104 to calculate a value from inputs, a request for the service fleet 104 to retrieve information from a database, and so forth. In some implementations, the transactions are implemented as API calls. The service fleet 104 receives the transactions or API calls from other computing devices (not shown).

The service fleet 104 may be configured to provide the throughput data 108 to the optimization system 102 using the network. In one example, the service fleet 104 generates log data when the service fleet 104 performs a data processing task. The log data may comprise information about activities performed by the service fleet 104. The log data may indicate that a transaction has been processed. The log data may also include various other information, such as the time that the transaction was processed, the name of the host 106 that processed the transaction, and so forth. In some implementations, the log data is stored in a log file that includes a collection of information about occurrences and times of previously processed transactions. By analyzing the information in the log file, the optimization system 102 may generate the throughput data 108.

The optimization system 102 may include a peak module 110 configured to generate peak data 112. The peak data 112 may indicate a peak quantity of processed transactions occurring over a designated period of time. The peak module 110 may analyze the throughput data 108 to determine the highest number of processed transaction per minute for a designated day. For example, the peak module 110 may determine that for yesterday, the highest number of processed transactions was 5,000 transactions per minute which occurred between 9:00 am and 9:01 am.

The optimization system 102 may be configured to access expense data 114 indicative of a price associated with the hardware. A datastore (not shown) may be configured to store information about prices related to individual pieces of hardware that comprise the service fleet 104. The expense data 114 may be entered by a user via a user interface. The optimization system 102 may be configured to access the expense data 114 from the datastore.

The optimization system 102 may include a hardware cost metric module 116 configured to generate hardware cost metric data 118. The hardware cost metric data 118 may be representative of a value indicating a cost associated with the performance of the hardware comprising the service fleet 104. The value may be expressed as a scaled number having values, for example, between 1 and 1000. The performance of the hardware may be expressed as the quantity of transactions that are processed by the service fleet 104 compared to the time and hardware resources used.

The hardware cost metric module 116 may generate the hardware cost metric data 118 based on the peak data 112 and the expense data 114. For example, the hardware cost metric module 116 may generate the hardware cost metric data 118 by dividing the expense associated with the hardware by the peak quantity of processed transactions occurring over a period of time. The costs described in this application may be designated in any suitable value-keeping currency, including, but not limited to dollars, yuan, digital currency, cryptocurrency, and so forth. The expense data 114 may indicate an expense of $2,000.00 associated with the hardware. The peak data 112 may indicate a peak quantity of 400 transactions per second occurring over the last week. The hardware cost metric module 116 may divide the $2,000.00 expense by the 400 transactions, resulting in the hardware cost metric data 118 having a value of 5. The value of 5 represents a cost associated with the hardware's performance of processing transactions compared to the cost of the hardware. The hardware cost metric data 118 may be a dimensionless number.

The optimization system 102 may be configured to access test data 120. The test data 120 may comprise sample quantities of transactions which may be run against the hardware. For example, the test data 120 may comprise a first set of 1000 sample transactions per second, a second set of 2000 sample transactions per second, a third set of 3000 sample transactions, and so forth. In some implementations, the optimization system 102 includes a test data generation module (not shown) configured to generate the test data 120.

A threshold module 122 may use the test data 120 as an input to generate threshold data 124. The threshold data 124 may indicate a value representative of an optimal cost associated with the performance of the hardware of the service fleet 104. The value may be expressed as a scaled number having values, for example, between 1 and 1000. When the hardware is running at the optimal value, the hardware may be described as performing at an optimum level. Performing at the optimum level may be described as the hardware running in a most efficient manner or cost effective manner. Generally, when the hardware is running at the optimal level, hardware does not need to be added or removed from the service fleet 104, because doing so would cause too much hardware to be used than is necessary to perform the transactions, or too little hardware to perform the transactions.

The threshold module 122 may be configured to use the test data 120 to execute benchmark tests against the hardware. Based on the benchmark test, the threshold module 122 may determine the maximum amount of transactions the hardware may process before one or more predetermined metrics reach one or more predetermined values. Determining the maximum amount of transactions the hardware may process is discussed in more detail below with reference to FIG. 4.

The threshold module 122 may use the expense data 114 and the test data 120 as inputs to generate threshold data 124. For example, the threshold module 122 may generate the threshold data 124 by dividing the expense value associated with the hardware by the maximum amount of transactions the hardware may process before one or more predetermined metrics reach the one or more predetermined values. Generating the threshold data 124 based on the expense data 114 and the test data 120 is discussed in more detail below with reference to FIG. 4.

The optimization system 102 may include a prediction module 126 configured to generate predicted hardware cost metric data 128. The predicted hardware cost metric data 128 may comprise a predicted cost associated with the performance of the hardware. The predicted cost may be expressed as a scaled number having values, for example, between 1 and 1000.

The prediction module 126 may generate the predicted hardware cost metric data 128 based on prediction data 130. The prediction data 130 may indicate a predicted quantity of transactions to be processed by the hardware. For example, the prediction data 130 may indicate that a current quantity of transactions processed by the hardware is expected to grow 3% over the next three months. The optimization system 102 may generate the predicted data 130 based on various information. For example, the optimization system 102 may analyze the quantity of transactions previously processed to predict the quantity of future transactions. For example, the optimization system 102 may determine a consistent growth of 5% in each of the last three years, indicating that the next year's expected growth may be 5%. In another example, the predicted quantity of processed transactions may be based on an introduction of a new product. The new product may be expected to cause an increase in the quantity of future processed transactions. In another example, the predicted quantity of processed transactions may be based on a planned reduction in price for one or more products. The reduction in price may be expected to cause an increase in the quantity of expected future processed transactions.

The prediction module 126 may generate the predicted hardware cost metric data 128 based on the hardware cost metric data 118 and the prediction data 130. For example, the hardware cost metric data 118 may indicate that the service fleet 104 has a cost of $10.00, and the prediction data 130 may indicate an expected increase in processed transactions of 100% over the next year. Based on the expected 100% growth information, the prediction module 126 may generate predicted hardware cost metric data 128 indicating that the value of the cost is predicted to increase at a rate of 0.83 each month, resulting in a cost of $20.00 after one year.

The optimization system 102 may include an optimization module 132 configured to generate optimization data 134. The optimization data 134 may be indicative of an amount of hardware that would cause the service fleet 104 to operate in a cost effective manner. As described above, operating in the cost effective manner may include running economically in terms of transactions being processed compared to the cost of the hardware being used to process the transactions.

The optimization system 102 may include a business driver module 136 configured to generate business driver data 138. The business driver data 138 may indicate particular transactions that have more impact on the performance of the service fleet 104 when compared to other transactions. Having more impact on the performance or being more dominant may include causing the hardware of the service fleet 104 to consume more resources when compared to other transactions. These particular transactions may be described as dominant transactions because they have more on an impact of the overall performance of the hardware of the service fleet 104. In some implementations, the business driver module 136 identifies business drivers by determining which API calls consume the most hardware. For example, a service may provide five different APIs to different client devices. The business driver module 136 may determine that one of the five APIs has a much stronger correlation to the traffic demand when compared to the other four APIs. The business driver module 136 may perform statistical or analytical techniques (e.g., regression analysis) to determine which of a plurality of APIs are more dominant when compared to the other APIs. Once the API is identified, the business drive module 136 may determine the owner of the identified API. Once the owner of the API is identified, the business driver module 136 may determine the business driver. The business driver may comprise various information such as information about new product launches, information indicating that when order volume increases, throughput increases. By identifying less than all of the APIs as the dominant API, the business driver module 136 may focus on more relevant APIs, resulting in an increase in the accuracy of the predictions.

In one example, the business driver module 136 may identify a more relevant API by determining which API is used more when compared to other APIs. In another example, the business driver module 136 may identify a more relevant API by determining which API calls cause more hardware to be consumed when processed. The business driver module 136 may identify the more relevant API(s) using log data as an input. The log data may be provided by the service fleet 104, and may indicate information about the number of API calls processed, and/or information identifying the clients which provides the API call.

In some implementations, the business driver module 136 generates scaling formula data 140. The scaling formula data 140 may comprise an algorithm that translates business driver data 138 into a value representative of the demand on the service. For example, the business driver module 136 may determine that for every 1 unit of API input, the service consumes two units of hardware. In this example, the algorithm may comprise multiplying the number of API units by 2. The demand of the service may be used as an input by the optimization module 132 to determine the optimization data 134. In some implementations, the optimization system 102 determines the prediction data 130 based on the business driver data 138 and the scaling formula data 140.

In FIG. 1, the optimization module 132 generates the optimization data 134 based on the predicted hardware cost metric data 128, the threshold data 124, the business driver data 138, and the scaling formula data 140. The optimization data 134 may indicate different amounts of hardware over time because the prediction data 130 may indicate expected changes of the demand for transactions to be processed by the service fleet 104. Generating the optimization data 134 based on the predicted hardware cost metric data 128 and the threshold data 124 is discussed in more detail below with reference to FIG. 6.

Figure 2:
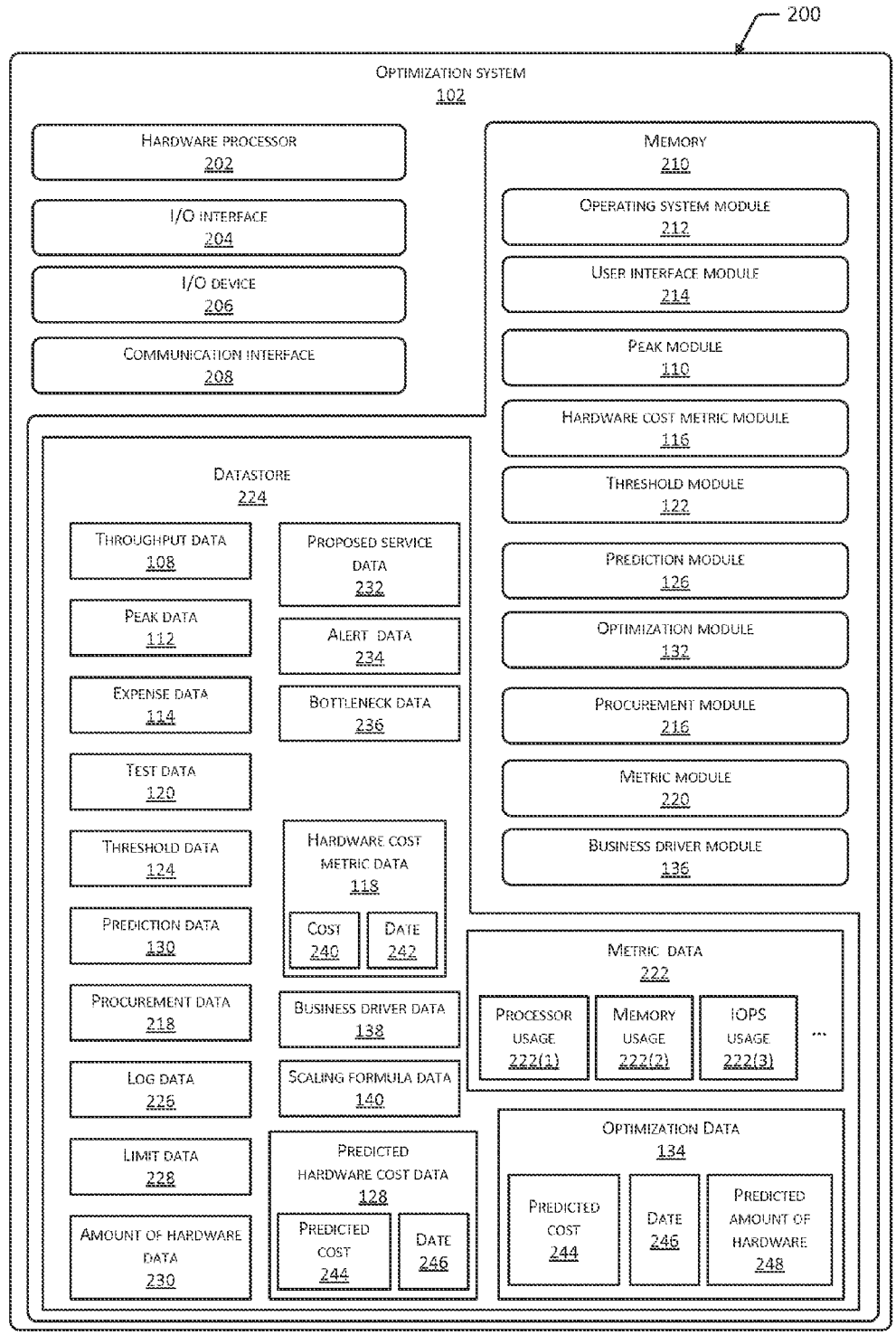
FIG. 2 is a block diagram of the optimization system configured to generate the optimization data based on the hardware cost metric data and the prediction data.

FIG. 2 is a block diagram of the optimization system 102 configured to generate the optimization data 134 based on the hardware cost metric data 118 and the predicted hardware cost metric data 128. The optimization system 102 may include at least one hardware processor 202 configured to execute stored instructions. The at least one hardware processor 202 (or "processor") may comprise one or more cores.

The optimization system 102 includes at least one I/O interface 204 which enables portions of the optimization system 102 (e.g., the hardware processor 202) to communicate with other devices. The I/O interface 204 may include inter-integrated circuit ("I2C"), serial peripheral interface bus ("SPI"), Universal Serial Bus ("USB"), RS-232, HDMI, TOSLINK, Bluetooth®, and so forth. The at least one I/O interface 204 may be operatively connected to at least one I/O device 206. In some implementations, certain I/O devices 206 are physically incorporated with the optimization system 102 or externally placed.

The at least one I/O device 206 may include one or more input devices such as a button or a microphone. The I/O device 206 may include one or more of a variety of output devices such as one or more displays or speakers.

The optimization system 102 may include at least one communication interface 208. The communication interface 208 may be configured to provide communications between the optimization system 102 and other devices, such as the service fleet 104, routers, access points, servers, other optimization systems 102, and so forth. The communication interface 208 may connect to the network.

The optimization system 102 may include at least one bus or other internal communications hardware or software that enables for the transfer of data between the various modules and components of the optimization system 102.

As illustrated in FIG. 2, the optimization system 102 may include at least one memory or memory device 210. The memory 210 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the optimization system 102.

The memory 210 may include at least one operating system ("OS") module 212. The OS module 212 may be configured to manage hardware resources such the I/O interface 204, the I/O devices 206, the communication interface 208, and provide various services to applications or modules executing on the hardware processor 202. The memory 210 may also store at least one of the following modules which may be executed as foreground applications, background tasks, daemons, and so forth.

In some implementations, a user interface module 214 is configured to provide a user interface to the user using the I/O devices 206 and to accept inputs received from the I/O devices 206. The user interface may include one or more visual, audible, or haptic elements. For example, the user interface may be configured to provide a graphic user interface, an audible user interface, and so forth.

The memory 210 may include the peak module 110 configured to generate the peak data 112. As discussed above, the peak module 110 may generate the peak data 112 by analyzing the throughput data 108.

The memory 210 may include the hardware cost metric module 116 configured to generate the hardware cost metric data 118. The hardware cost metric module 116 may generate the hardware cost metric data 118 using the peak data 112 and the expense data 114 as inputs. The hardware cost metric module 116 may generate the hardware cost metric data 118 by dividing the expense associated with the hardware by the peak quantity of processed transactions occurring over a period of time.

The memory 210 may include the threshold module 122 configured to generate the threshold data 124. The threshold module 122 may generate the threshold data 124 using the expense data 114 and the test data 120 as inputs. Using the test data 120, the threshold module 122 may execute benchmark tests. The benchmark tests may be executed periodically based on times indicated by the test data 120. The benchmark may run a number of tests against the hardware. In some implementations, the benchmark test is configured to determine the maximum amount of transactions the hardware may process before certain predetermined metrics associated with the service fleet 104 (e.g., processor usage) reach a predetermined threshold value. The predetermined value may be described as threshold capacity value. In one example, the threshold module 122 generates the threshold data 124 by dividing the expense associated with the hardware by the maximum amount of transactions that can be processed by the hardware before the predetermined capacity thresholds are met.

The memory 210 may include the prediction module 126 configured to generate the predicted hardware cost metric data 128. The prediction module 126 may generate the predicted hardware cost metric data 128 using the hardware cost metric data 118 and the prediction data 130 as inputs. For example, the hardware cost metric data 118 may indicate a cost of $10.00, and the prediction data 130 may indicate an expected increase in processed transactions of 100% over the next year. Based on the expected growth information, the prediction module 126 generates the predicted hardware cost metric data 128 indicating predicted values of the cost which increases at a rate of about $0.83 each month, resulting with a cost value of $20.00 after one year.

The memory 210 may include the optimization module 132 configured to generate the optimization data 134. The optimization module 132 may generate the optimization data 134 using the predicted hardware cost metric data 128 and the threshold data 124 as inputs.

The memory 210 may include a procurement module 216 configured to generate procurement data 218. The procurement data 218 may comprise information about one or more amounts of hardware for ordering. The amounts of hardware indicated by the procurement data 218 may be added to the service fleet 104, which may cause the service fleet 104 to run at an optimal level. The procurement module 216 may provide the procurement data 218 to a supplier computing device associated with a supplier that delivers or supplies the additional amount of hardware. The procurement module 216 may generate the procurement data 218 based on the optimization data 134.

The memory 210 may include a metric module 220 configured to generate metric data 222. The metric data 222 may comprise metrics indicative of resources consumed during operation. The metrics may comprise data which may be qualitative or quantitative about one or more aspects of operation of the service fleet 104. These metrics may be generated during processing of actual transactions, or based on the execution of benchmark tests using predetermined transactions or sample transactions. In some implementations, the service fleet 104 is configured to generate the metric data 222, and provide the metric data 222 to the optimization system 102.

The metrics may include processor usage 222(1), memory usage 222(2), IOPS usage 222(3), and so forth. Other metrics may include disk usage, latency, bytes sent on network per second, number of TCP connections, number of cache lookups, and so forth.

In some implementations, the memory 210 includes a datastore 224 for storing information. The datastore 224 may use a flat file, database, linked list, tree, or other data structure to store the information. In some implementations, the datastore 224, or a portion thereof, may be distributed across at least one other device, such as a server, a network storage device, and so forth. As illustrated in FIG. 2, the datastore 224 may include at least one of the throughput data 108, the peak data 112, the expense data 114, the hardware cost metric data 118, the test data 120, the threshold data 124, the predicted hardware cost metric data 128, the prediction data 130, the optimization data 134, the business driver data 138, the scaling formula data 140, the procurement data 218, the metric data 222, log data 226, limit data 228, amount of hardware data 230, proposed service data 232, alert data 234, or bottleneck data 236.

The throughput data 108 may indicate quantities of processed transactions occurring over a period of time. The transaction may comprise a request for performance of a data processing task. For example, the transaction may comprise a request to calculate a value from inputs, a request to retrieve information from a database, and so forth. In some implementations, the transactions are implemented as API calls. The optimization system 102 may generate the throughput data 108 based on the log data 226 received from the service fleet 104. The log data 226 may comprise information about activities performed by one or more hosts 106 of the service fleet 104.

The peak data 112 may indicate a peak quantity of processed transactions occurring over a designated period of time. The expense data 114 may indicate an expense associated with the hardware. The expense may be described as the total cost of ownership for the installed hardware for the service fleet 104.

The hardware cost metric data 118 may comprise information representative of a cost 240 associated with the performance of the hardware. The performance of the hardware may be described as the quantity of transactions that are processed by the service fleet 104 compared to amount of hardware resources used. The cost 240 may be expressed as a scaled number having values, for example, between 1 and 1000. The hardware cost metric data 118 may also comprise information about a date 242 associated with the cost 240. For example, the hardware cost metric data 118 may indicate that today the fleet service 104 is running at a cost 240 of $50.00. The test data 120 may comprise sample quantities of transactions which may run against the service fleet 104.

The threshold data 124 may indicate an optimal cost associated with the performance of the hardware. The optimal cost may be expressed as a scaled number having values, for example, between 1 and 1000. When an analysis of the hardware indicates that the cost 240 associated with the performance of the hardware is at the optimal cost, the hardware may be described as performing at an optimum level. Performing at the optimum level may be described as the hardware running in a most efficient manner or cost effective manner. Generally, when the hardware is running at the optimal level, hardware does not need to be added or removed from the service fleet 104, because doing so would cause the hardware to not run at the optimal level.

The predicted hardware cost metric data 128 may comprise a predicted cost 244 associated with the performance of the hardware. The predicted cost 244 may be expressed as a scaled number having values, for example, between 1 and 1000. The predicted hardware cost metric data 128 may also comprise information about one or more dates 246 associated with the predicted cost 244. For example, the predicted hardware cost metric data 128 may indicate a plurality of different predicted costs 244 for each of the next 30 days.

The prediction data 130 may indicate a predicted quantity of transactions to be processed by the hardware. The prediction data 130 may indicate that a current quantity of transactions processed by the hardware is expected to grow 3% over the next three months. The predicted quantity may be determined based on an analysis of the quantity of transactions previously processed to predict the quantity of future transactions. The predicted quantity may be determined based on an introduction of a new product. The new product may be expected to cause an increase in the quantity of future processed transactions. In another example, the predicted quantity may be determined based on a planned reduction in price for one or more products. The reduction in price may be expected to cause an increase in the quantity of future processed transactions.

The optimization data 134 may comprise information indicating an amount of hardware that, if implemented, would cause the service to operate in a cost effective manner. In some implementations, the optimization data 134 includes the predicted cost 244, the one or more dates 246, and predicted amounts of hardware 248. For example, the optimization data 134 may include data representing specific predicted costs for each of the next 60 days, and data representing the amount of hardware needed for the service fleet 104 to run at the predicted costs values.

The limit data 228 may comprise the threshold capacity used to generate the threshold data 124. For example, the limit data 228 may comprise data representative of the 53.4% threshold capacity described above. In some implementations, the threshold module 122 uses the limit data 228 as an input to the generate the threshold data 124. In some implementations, the optimization system 102 enables a user to key in the threshold capacity using the user interface module 214.

The amount of hardware data 230 may indicate the amount of hardware currently being used in the service fleet 104. The amount of hardware may be expressed in various ways. For example, the amount of hardware may be expressed as a number of hardware units. The hardware may comprise mechanical, magnetic, optical, and electrical devices, such as processors, storage devices, I/O interfaces, and so forth. In some implementations, the optimization module 132 uses the amount of hardware data 230 as an input to generate the optimization data 134.

The proposed service data 232 may be representative of a proposed service or API call. For example, a client device may be interested in improving the cost of the API call currently running provided to the service fleet 104. The proposed API call may include a new set of instructions that replaces a current API call. In another example, the proposed API call comprises an update to the API call currently running against the service fleet 104. The optimization system 102 may be configured to determine whether the proposed service or API call would increase or decrease certain performance metrics of the service fleet 104. In response to a determination that the proposed service would increase the performance metrics to a value that is at least equal to or greater than a threshold value, the optimization system 102 may generate alert data 234 indicating the occurrence the one or more performance metrics being equal or more than the threshold value. The optimization system 102 may provide the alert data 234 to a client computing device associated with an administrative user.

The bottleneck data 236 may indicate which hardware resource can be identified as the bottleneck. The bottleneck may be described as a constraining hardware resource that limits the number of transactions that may be processed by the service fleet 104. The optimization system 102 may generate the bottleneck data 236 when executing the benchmark tests described above. For example, as the optimization system 102 runs the sample quantities of transactions against the service fleet 104, the optimization system 102 may identify the bottleneck as the hardware component that reaches the capacity threshold first. By identifying the bottleneck, the optimization system 102 enables administrative users to focus on improving particular hardware components, increasing the performance of the service fleet 104.

The business driver data 138 may indicate a particular business driver of the service fleet 104. The business driver may be described as a particular transaction that has more impact on the overall performance of the service fleet 104 when compared to other types of transactions. In some implementations, the prediction module 126 uses the business driver data 138 as an input to generate the predicted hardware cost metric data 128. By generating the business driver data 138, the optimization system 102 may generate more accurate predictions because the business driver data 138 may identify more relevant transactions which affect the predictions.

Figure 3:
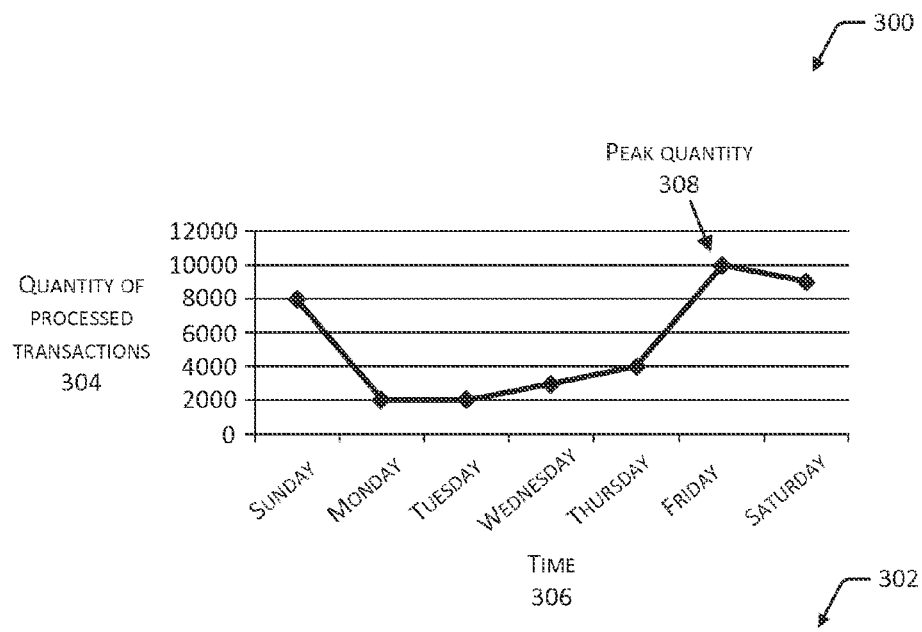
FIG. 3 is a line chart illustrating example quantities of transactions processed over a period of time, and a block diagram of the hardware cost metric module generating the hardware cost metric data based on the peak data and the expense data.
Figure 3:
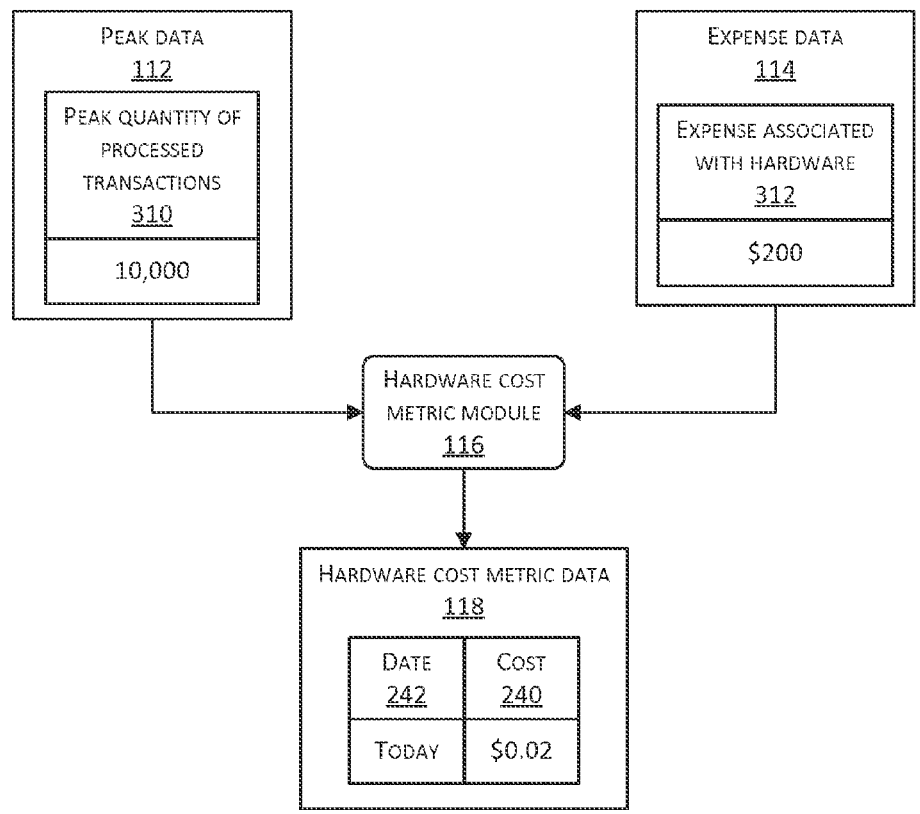

FIG. 3 is a line chart 300 illustrating example quantities of transactions processed over a period of time, and a block diagram 302 of the hardware cost metric module 116 generating the hardware cost metric data 118 based on the peak data 112 and the expense data 114.

The line chart 300 includes a y-axis associated with quantity of processed transactions 304, and an x-axis associated with time 306. The time 306 covers one week, from Sunday to Saturday. In some implementations, the optimization system 102 is configured to display the line chart 300. The information included in the line chart 300 may be used to determine the peak quantity of transactions 308 for a particular period of time. In this example, the peak quantity of transactions 308 may be described as the highest number of transactions per day over the week. The line chart 300 indicates that the following quantities of transactions were processed as shown in Table 2:

TABLE 2

| Day | Number of Processed Transactions |
|---|---|
| Sunday | 8,000 |
| Monday | 2,000 |
| Tuesday | 2,000 |
| Wednesday | 3,000 |
| Thursday | 4,000 |
| Friday | 10,000 |
| Saturday | 9,000 |

In this example, the peak quantity of processed transactions 308 is 10,000, which occurred on Friday. In FIG. 3, the peak data 112 includes a field labeled peak quantity of processed transactions 310, indicating quantity of 10,000. The expense data 114 includes a field labeled expense associated with hardware 312, indicating an expense of $200.00. In some implementations, the expense data 114 is keyed in by a user of the optimization system 102.

In FIG. 3, the hardware cost metric module 116 generates the hardware cost metric data 118. The hardware cost metric data 118 includes the cost 240, indicating a cost of $0.02, and the date 242, indicating a date of today. The $0.02 represents the cost associated with the performance of the hardware of an example service fleet 104. In this example, the hardware cost metric module 116 generates the cost of $0.02 by dividing the expense associated with the hardware 312 (i.e., the $200.00) by the peak quantity of processed transactions 310 (i.e., the 10,000 processed transactions occurring on Friday).

Figure 4:
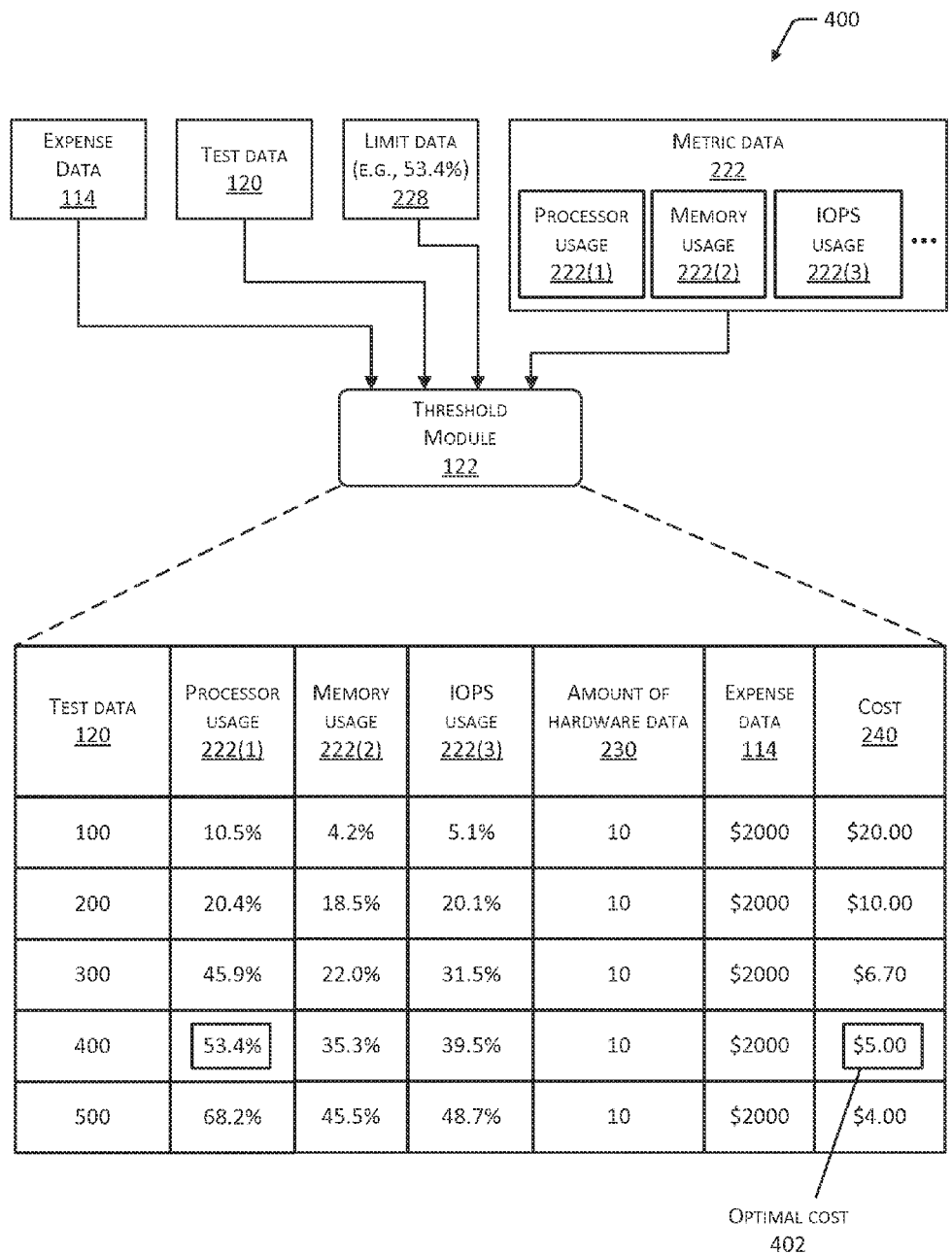
FIG. 4 is a block diagram of the threshold module generating the threshold data using expense data, test data, and limit data as inputs.

FIG. 4 is a block diagram 400 of the threshold module 122 generating the optimal cost 402 using the expense data 114, the test data 120, the limit data 228, and the metric data 222 as inputs. In this example, the expense data 114 indicates an expense associated with the hardware of $2000.00. The limit data 228 indicates that the threshold capacity value is 53.4% for each of the metrics of the service fleet 104 which are monitored to determine the optimum cost 402. In this example, the metric data 222 includes the processor usage 222(1), the memory usage 222(2), and the IOPS usage 222 (3). The amount of hardware data 230 indicates that the service fleet 104 includes 10 units of hardware.

In FIG. 4, the threshold data module 122 determines the optimal cost 402 by running the sample quantities of transactions of the test data 120 against the hardware of the service fleet 104 (not shown). As the sample quantities of transactions increase, the values of the metrics increase because more resources are consumed to process the increasing amount of transactions. When the sample quantities of transactions cause one of the metrics to run at 53.4% or higher, the threshold module 122 is configured to determine the optimal cost 402.

The optimal cost 402 may be determined by dividing the expense associated with the hardware 312 (i.e., the $2,000.00) by the number of transactions that cause the value of the metric to be equal to or more than 53.4%. In FIG. 4, the quantity of 400 transactions causes the value of the processor usage 222(1) to be equal to 53.4%. Accordingly, the threshold module 122 divides the expense associated with the hardware 312 (i.e., the $2,000.00) by 400, which results in the determination of the $5.00 optimal cost 402.

In FIG. 4, because the processor usage metric 222(1) is the first metric to reach the threshold capacity of 53.4%, the optimization system 102 may identify the processor of the service fleet 104 as the bottleneck or constraining metric. By identifying the bottleneck, an administrator of the service fleet 104 may focus the improvements to the identified bottleneck. For example, if the optimization system 102 identifies the memory of the service fleet 104 as the bottleneck, additional memory may be added to the service fleet 104. Adding the memory to the service fleet 104 causes a change to the service fleet 104. When a change is made to the service fleet 104, the optimization system 102 may be configured to recalibrate. Recalibrating may include generating the threshold data 124 to determine a new optimum cost for the changed service fleet 104. Changes made to the service fleet 104 may cause the optimum cost associated with the service fleet 104 to change.

Figure 5:
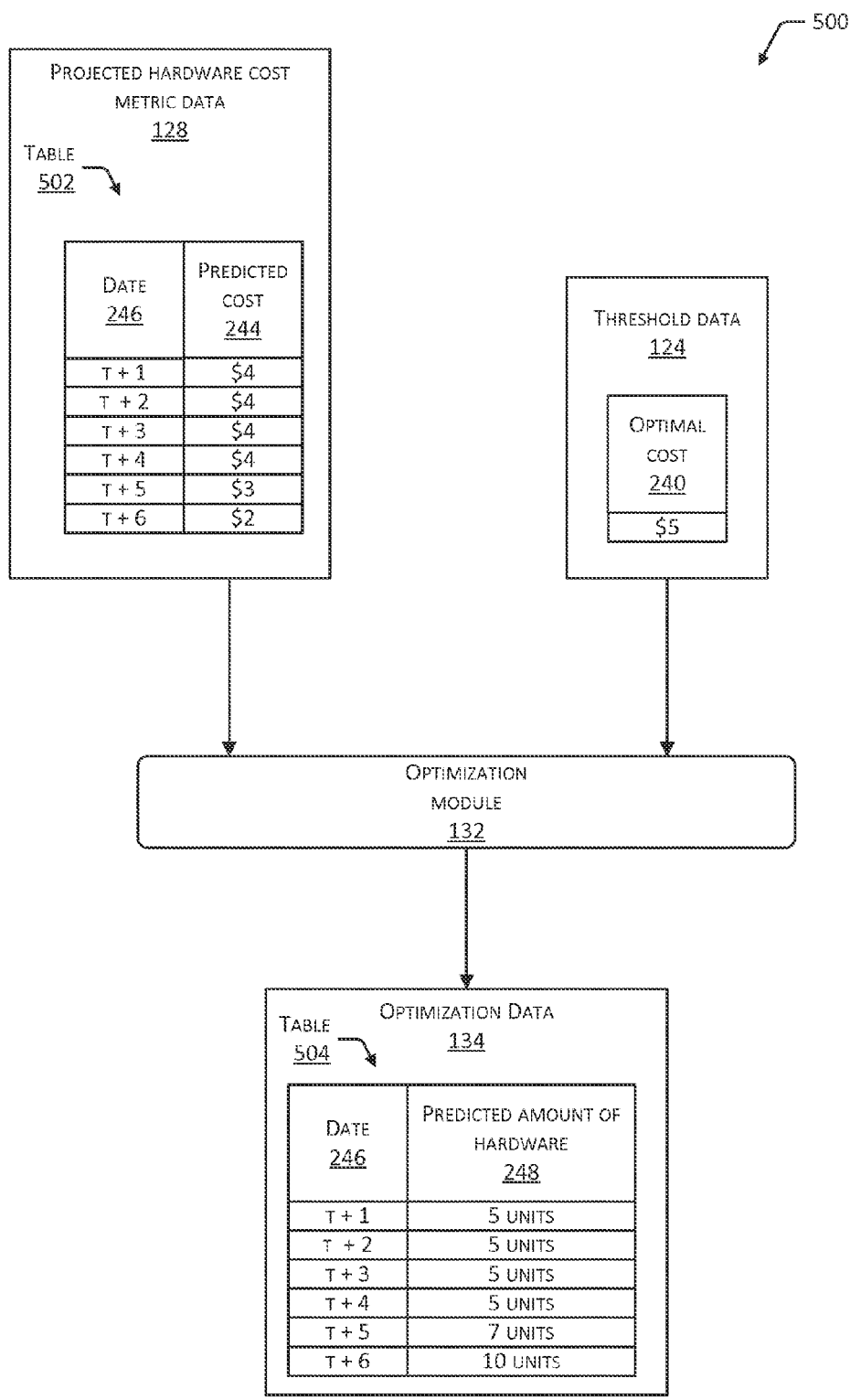
FIG. 5 is a block diagram of the optimization module generating the optimization data, illustrating the need for the amount of hardware to increase for the service to run at an optimal level.

FIG. 5 is a block diagram 500 of the optimization module 132 generating the optimization data 134 indicating the predicted amount of hardware 248 increasing for the service fleet 104 to run at the optimal cost 240. The predicted hardware cost metric data 128 includes a table 502 which includes data characterized as being organized in columns and rows. The rows comprise the date 246 and an associated predicted cost 244. In this example, the letter "T" represents an abbreviation for time. The time may be representative of today. According "T+1" may be described as tomorrow, "T+2" may be described as two days after today, and so forth. In FIG. 5, the predicted hardware cost metric data 128 includes the following values as shown in Table 3:

TABLE 3

| Date 246 | Predicted cost 244 |
|---|---|
| T + 1 | $4.00 |
| T + 2 | $4.00 |
| T + 3 | $4.00 |
| T + 4 | $4.00 |
| T + 5 | $3.00 |
| T + 6 | $2.00 |

As indicated by the table 502, the predicted cost 244 indicates a predicted decrease in cost. In this example, the predicted cost 244 is determined by dividing the expense associated with the hardware 312 by the predicted peak quantity of processed transactions for each day. Accordingly, the predicted cost 244 may decrease because of an expected removal of hardware from the service fleet 104. The predicted cost 244 may also decrease because of an expected increase in the peak quantity of processed transactions.

The threshold data 124 comprises the optimal cost 240 indicating an optimal cost of $5.00. The optimization data 134 includes a table 504 which includes data characterized as being organized in columns and rows. The rows comprise the date 246 and an associated predicted amount of hardware 248 which, if implemented by the service fleet 104, would cause the service fleet 104 to operate having the optimal cost 240 of $5.00. The optimization module 132 calculates the optimization data 134 using the predicted hardware cost metric data 128 and the threshold data 124 as inputs.

Figure 6:
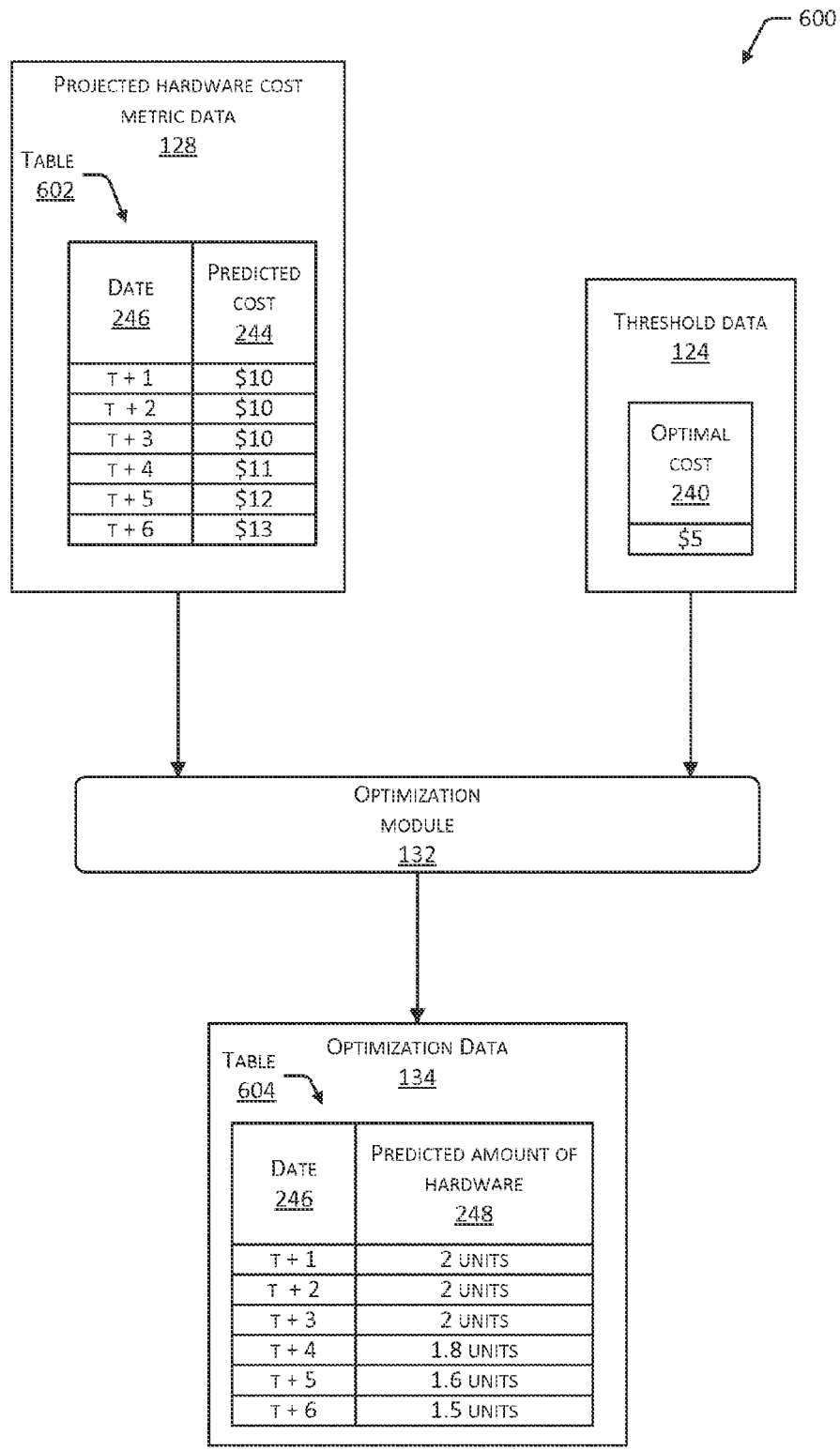
FIG. 6 is a block diagram of the optimization module generating the optimization data, illustrating the need for the amount of hardware to decrease for the service to run at an optimal level.

FIG. 6 is a block diagram 600 of the optimization module 132 generating the optimization data 134 indicating the predicted amount of hardware 248 decreasing for the service fleet 104 to run at the optimal cost 240. The predicted hardware cost metric data 128 includes a table 602 which includes data characterized as being organized in columns and rows. The rows comprise the date 246 and an associated predicted cost 244. The letter "T" represents an abbreviation for time. The time may be representative of today. According "T+1" may be described as tomorrow, "T+2" may be described as two days after today, and so forth. In FIG. 6, the predicted hardware cost metric data 128 includes the following values as shown in Table 4:

TABLE 4

| Date 246 | Predicted cost 244 |
|---|---|
| T + 1 | $10.00 |
| T + 2 | $10.00 |
| T + 3 | $10.00 |
| T + 4 | $11.00 |
| T + 5 | $12.00 |
| T + 6 | $13.00 |

As indicated by the table 602, the predicted cost 244 indicates a predicted increase in cost. In this example, the predicted cost 244 is determined by dividing the expense associated with the hardware 312 by the predicted peak quantity of processed transactions for each day. Accordingly, the predicted cost 244 may increase because of an expected addition of hardware into the service fleet 104. The predicted cost 244 may also increase because of an expected decrease in the peak quantity of processed transactions.

The threshold data 124 comprises the optimal cost 240 indicating an optimal cost of $5.00. The optimization data 134 includes a table 604 which includes data characterized as being organized in columns and rows. The rows comprise the date 246 and an associated predicted amount of hardware 248 which, if implemented by the service fleet 104, would cause the service fleet 104 to operate having the optimal cost 240 of $5.00. The optimization module 132 calculates the optimization data 134 using the predicted hardware cost metric data 128 and the threshold data 124 as inputs.

Figure 7:
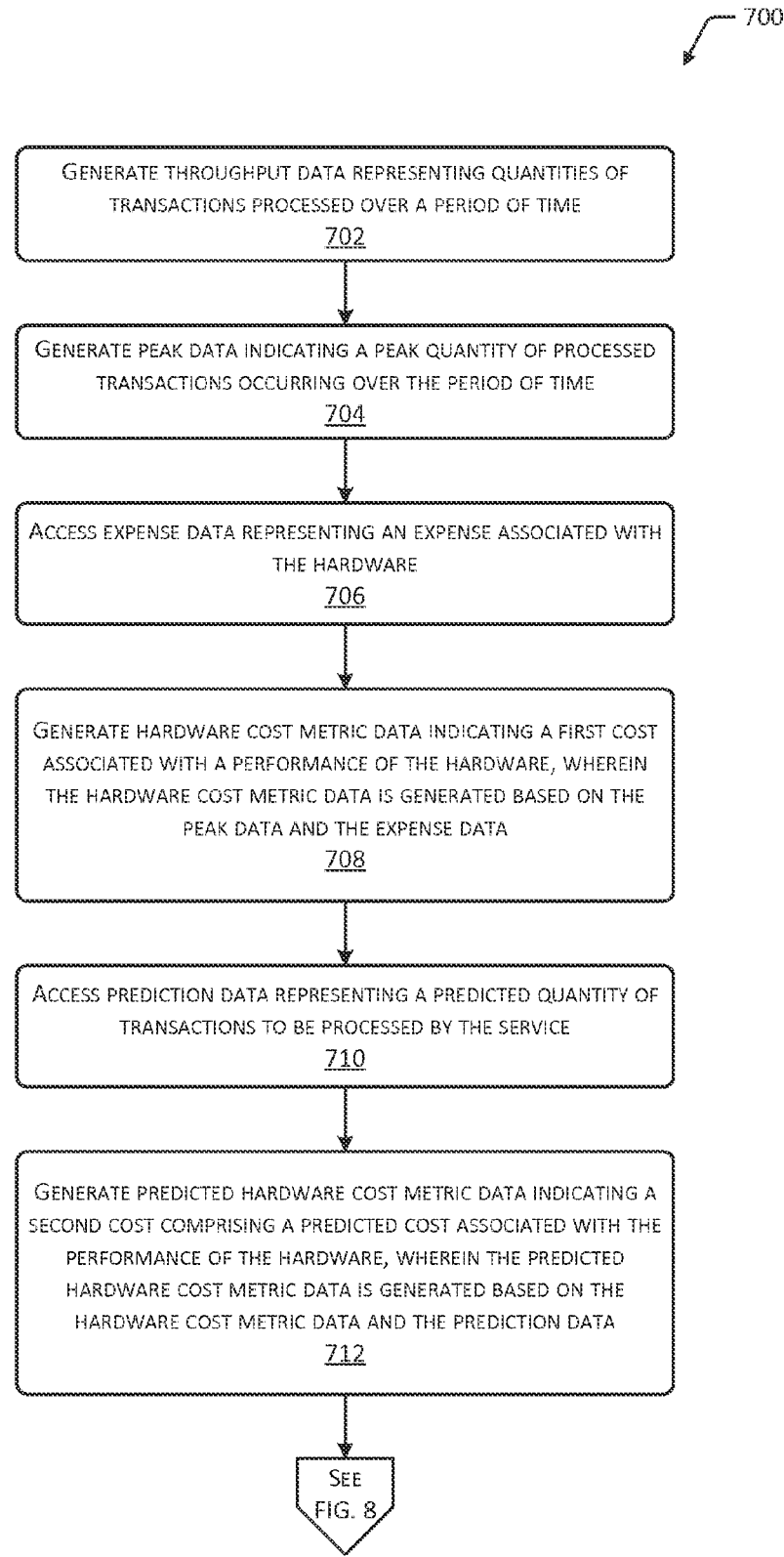
FIGS. 7 and 8 depict a flow diagram illustrating the process of generating optimization data indicative of an amount of hardware that changes the value of hardware cost metric data to an optimal value generated based on the predicted hardware cost metric data.
Figure 8:
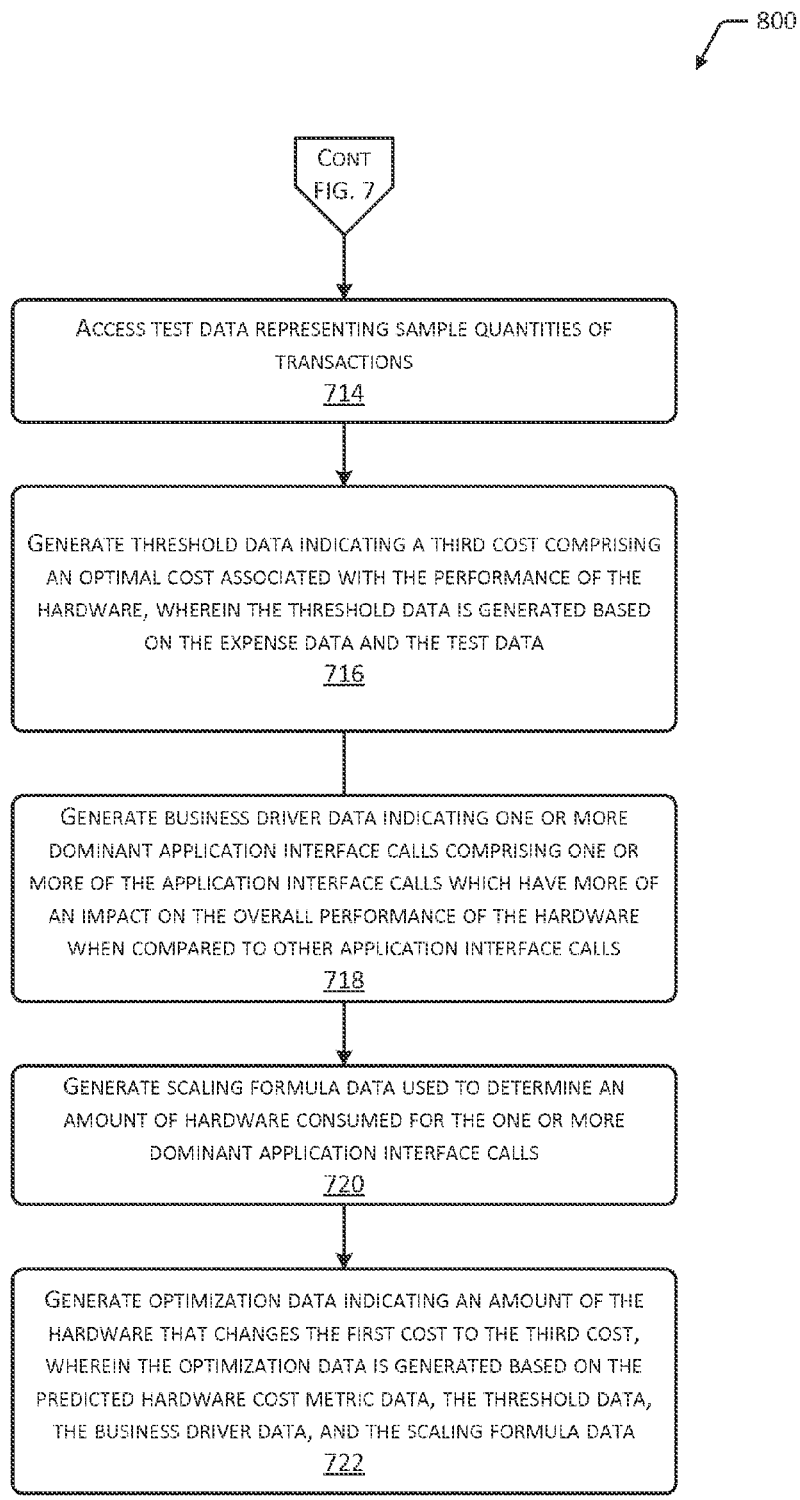

FIGS. 7 and 8 depict a flow diagram 700 illustrating the process of generating the optimization data 134 indicative of an amount of hardware that changes the value of hardware cost metric data 118 to an optimal value generated based on the predicted hardware cost data 128. The optimization system 102 may implement the process 700. Although the process 700 is described with reference to the flowchart illustrated in FIGS. 7 and 8, many other methods performing the acts associated with the process 700 may be used. For example, the order of many of the steps may be changed, some of the steps described may be optional, and additional steps may be included.

At block 702, the optimization system 102 generates the throughput data 108 representing quantities of transactions over a period of time. The transactions are processed by a service operating on hardware. In one example, the throughput data 108 indicates the total quantity of transactions processed by the service for each day over a month.

At block 704, the optimization system 102 generates the peak data 112 indicating the peak quantity of processed transactions 310 occurring over the period of time. Continuing with the example, an analysis of the total quantity of transactions processed by the service for each day over the month may indicate that the highest quantity of transactions occurred on the first of the month.

At block 706, the optimization system 102 accesses the expense data 114 representing an expense associated with the hardware 312. In some implementations, the optimization system 102 enables a user to key in the expense using the user interface module 214.

At block 708, the optimization system 102 generates the hardware cost metric data 116 indicating a first cost associated with a performance of the hardware. The hardware cost metric data 116 is generated based on the peak data 112 and the expense data 114. In one example, the optimization system 102 is generated by dividing the expense associated with the hardware 312 by the peak quantity of processed transactions 310 occurring over the period of time.

At block 710, the optimization system 102 accesses the prediction data 130 representing a predicted quantity of transactions to be processed by the service. The predicted quantity of transactions may be predicted based on at least one: a historical analysis of quantities of transactions processed by the service; an introduction of a new product; or a planned reduction in price for one or more products.

At 712, the optimization system 102 generates the predicted hardware cost metric data 128 indicating a second cost comprising a predicted cost associated with the performance of the hardware. The predicted hardware cost metric data 128 is generated based on the hardware cost metric data 118 and the prediction data 130.

At block 714, the optimization system 102 accesses the test data 120 representing sample quantities of transactions. At block 716, the optimization system 102 generates the threshold data 124 indicating a third cost comprising an optimal cost associated with the performance of the hardware. The threshold data 124 is generated based on the expense data 114 and the test data 120. As discussed above, the optimization system 102 may generate the threshold data 124 by dividing an expense associated with the hardware 312 by the maximum quantity of transactions the service can process until one or more metrics of the service fleet 104 reach a threshold value.

At block 718, the optimization system 102 generates the business driver data 138 indicating one or more dominant API calls comprising one or more of the APIS calls which have more of an impact on the overall performance of the hardware when compared to other API calls. The business driver data 138 may indicate particular transactions that have more impact on the overall performance of the service fleet 104 when compared to other transactions. These particular transactions may be described as dominant transactions because they have more of an impact on the overall performance of the hardware of the service fleet 104. As discussed above with regard to FIG. 1, in some implementations, the optimization system 102 identifies business drivers by determining which API calls consume the most hardware. The business driver may comprise various information such as information about new product launches, information indicating that when order volume increases, throughput increases, and so forth. By identifying less than all of the APIs as the dominant API, the optimization system 102 may focus on more relevant APIs, resulting in an increase in the accuracy of the predictions.

At block 720, the optimization system 102 generates the scaling formula data 140 used to determine an amount of hardware consumed for the one or more dominant API calls. The scaling formula data 140 may include data representative of an algorithm used to translate business driver data 138 into a value representative of the demand on the service. For example, the optimization system 102 may determine that for every 1 unit of API input, the service consumes two units of hardware. In this example, the algorithm may comprise multiplying the number of API units by 2.

At block 722, the optimization system 102 generates the optimization data 134 indicating an amount of the hardware that changes the first cost to the third cost. The optimization data 134 is generated based on the threshold data 124 and the predicted hardware cost metric data 128.

In some implementations, the optimization system 102 is configured to generate the procurement data 218 based on the optimization data 134. The procurement data 218 may indicate an amount of additional hardware that needs to be ordered for the service fleet 104. The optimization system 102 may provide the procurement data 218 to a supplier computing device associated with a supplier that supplies or delivers the additional hardware.

Figure 9:
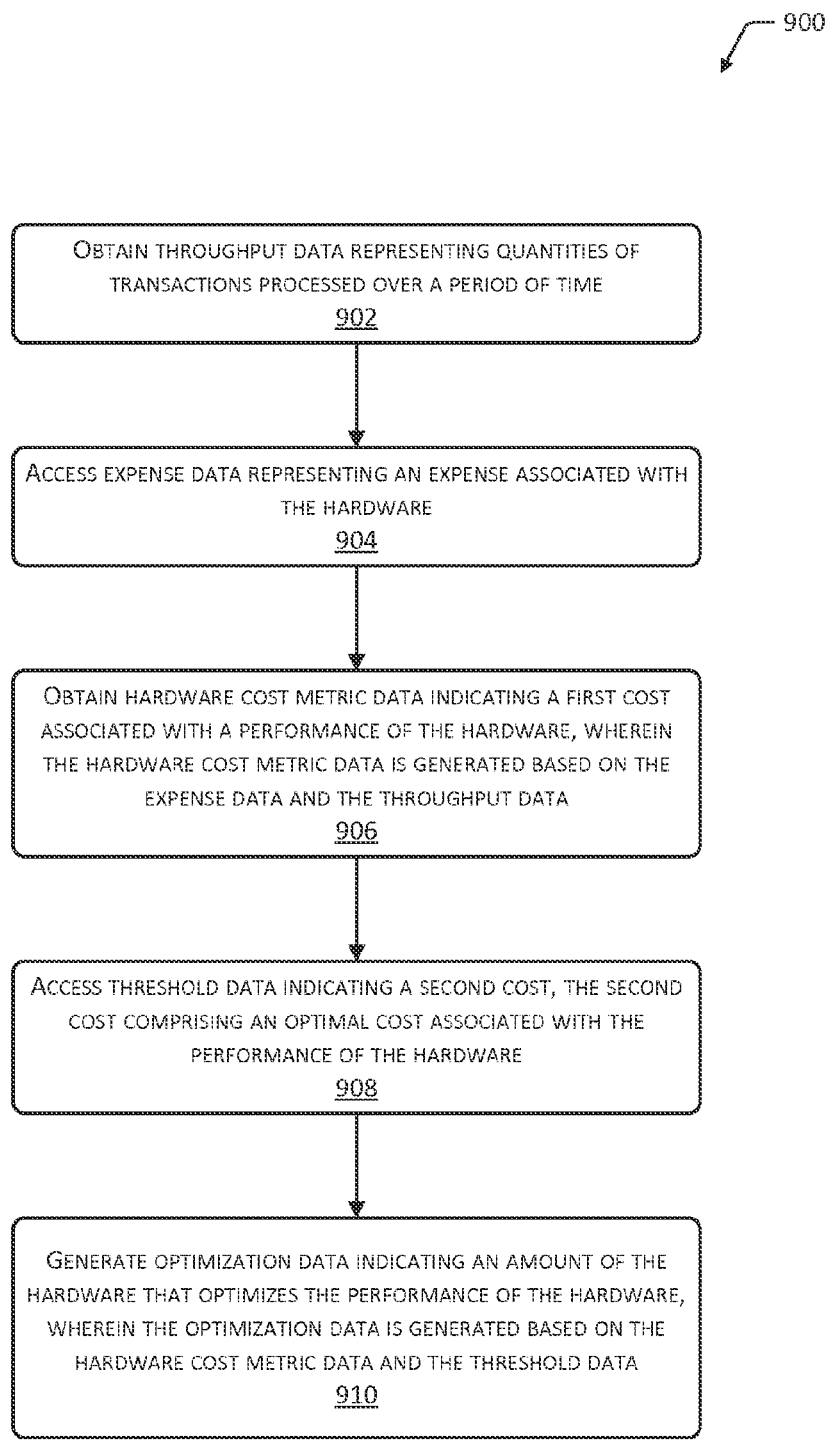
FIG. 9 is a flow diagram illustrating the process of generating optimization data indicative of an amount of hardware that changes the value of hardware cost metric data to an optimal value.

FIG. 9 is a flow diagram 900 illustrating the process of generating the optimization data 134 indicative of an amount of hardware that changes the value of the hardware cost metric data 118 to an optimal value. The optimization system 102 may implement the process 900. Although the process 900 is described with reference to the flowchart illustrated in FIG. 9, many other methods performing the acts associated with the process 900 may be used. For example, the order of many of the steps may be changed, some of the steps described may be optional, and additional steps may be included.

At block 902, the optimization system 102 obtains the throughput data 108 representing quantities of transactions processed over a period of time. A service on the hardware processes the transactions. The service may comprise a set of instructions that execute to perform computational tasks. In some implementations, the optimization system 102 obtains the throughput data 108 by generating the throughput data 108 based on the log data 226 as discussed above. In other implementations, the optimization system 102 obtains the throughput data 108 by accessing a datastore configured to store the throughput data 108. The optimization system 102 may generate the throughput data 108 based on the log data 226 which comprises recorded information about activities performed by the service.

At block 904, the optimization system 102 accesses the expense data 114 representing an expense associated with the hardware. In some implementations, the optimization system 102 enables a user to key in the expense using the user interface module 214.

At block 906, the optimization system 102 obtains the hardware cost metric data 118 indicating a first cost associated with a performance of the hardware. The hardware cost metric data 118 is generated based on the expense data 114 and the throughput data 108. In some implementations, the optimization system 102 may generate the hardware cost metric data 118 by dividing the expense associated with the hardware 312 by the peak quantity of processed transactions 310 indicated by the peak data 112. In some implementations, the optimization system 102 obtains the hardware cost metric data 118 by generating the hardware cost metric data 118 as discussed above. In other implementations, the optimization system 102 obtains the throughput data 108 by accessing a datastore configured to store the hardware cost metric data 118.

At block 908, the optimization system 102 accesses the threshold data 124 indicating a second cost. The second cost comprises an optimal cost associated with the performance of the hardware. As discussed above, the optimization system 102 may generate the threshold data 124 by running benchmark tests against the service fleet 104 to determine a maximum amount of transactions that the service fleet 104 can handle before one or more metric values of the service fleet 104 become too high.

At block 910, the optimization system 102 generates the optimization data 134 indicating an amount of the hardware that optimizes the performance of the hardware. The optimization data 134 is generated based on the hardware cost metric data 118 and the threshold data 124. In one implementation, optimizing the performance of the hardware includes causing the cost value of the hardware cost metric data 118 to change to an optimal cost value that is indicated by the threshold data 124. In another implementation, optimizing the performance of the hardware includes causing the cost value of the hardware cost metric data 118 to change to an optimal cost value that is indicated by the threshold data 124. Optimizing the performance of the hardware may comprise causing the performance of the hardware to operate in a more cost effective manner.

In some implementations, the optimization system 102 is configured to access proposed service data 232 representative of a proposed service. The proposed service may be different from the service currently running on the hardware of the service fleet 104. The optimization system 102 may determine whether the proposed service will change any performance metrics of the service fleet 104. For example, an administrative user may want to replace the current service with a newly designed service. Unknown to the administrative user, the new service may consume different amounts of resources of the hardware of the service fleet 104. In response to a determination that the new service would cause one or more of the performance metrics (e.g., processor usage 222(1), memory usage 222(2), and IOPS usage 222(3)) to be equal to or more than a threshold value, the optimization system 102 may generate the alert data 234 indicating the occurrence of the one or more performance metrics being equal to or more than the threshold value. The optimization system 102 may provide the alert data 234 to a client computing device associated with an administrative user.

In response to a determination that the new service would cause one or more of the performance metrics (e.g., processor usage 222(1), memory usage 222(2), and IOPS usage 222(3)) to be equal to or less than a threshold value, the optimization system 102 may generate procurement data 218 indicating a need to reduce or terminate an order of additional hardware previously ordered. The optimization system 102 may provide the procurement data 218 to a supplier that supplies the additional hardware.

In some implementations, the service includes a plurality of APIs. The optimization system 102 may be configured to determine a business driver associated with one or more of the APIs. Once the business driver is determined, the optimization system 102 may generate the prediction data 130 using the one or more business drivers.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method comprising:
generating, via at least one of one or more computing devices, throughput data representative of quantities of transactions processed over a period of time, wherein the transactions are processed by a service operating on hardware, wherein the service comprises a set of instructions that execute to perform computational tasks;
accessing expense data representative of an expense associated with the hardware; generating, via at least one of the one or more computing devices, hardware cost metric data indicative of a first cost associated with a performance of the hardware, wherein the hardware cost metric data is generated based on the expense data and the throughput data;
accessing threshold data indicative of a second cost, the second cost comprising an optimal cost associated with the performance of the hardware based on at least one of the hardware cost metric data reaching a threshold capacity;
accessing prediction data indicative of a predicted quantity of transactions to be processed by the service;
generating predicted hardware cost metric data indicative of a third cost comprising a predicted cost associated with the performance of the hardware, wherein:
the predicted hardware cost metric data is generated based on the hardware cost metric data and the prediction data; and
generating, via at least one of the one or more computing devices, optimization data indicative of an amount of the hardware that changes the first cost to the second cost, wherein the optimization data is generated based on the predicted hardware cost metric data and the threshold data.

2. The method of claim 1, further comprising:
accessing proposed service data representative of a proposed service, the proposed service being different from the service operating on the hardware;
determining that in response to the proposed service being executed on the hardware, at least one or more performance metrics will be equal to or less than a threshold value;
generating procurement data indicating a need to reduce or terminate an order of additional hardware previously ordered; and
provide the procurement data to a supplier computing device associated with a supplier that supplies the additional hardware.

3. The method of claim 1, further comprising:
accessing proposed service data representative of a proposed service comprising a set of instructions that would execute on the hardware, the proposed service being different from the service operating on the hardware;
determining that in response to the proposed service being executed on the hardware, at least one or more performance metrics will be equal to or more than a threshold value;
generating alert data comprising information about the occurrence the one or more performance metrics being equal or more than the threshold value; and
providing the alert data to client computing device associated with an administrative user.

4. The method of claim 1, further comprising accessing test data representative of sample quantities of transactions, wherein the threshold data is generated based on the expense data and the test data.

5. The method of claim 1, further comprising:
generating first metric data comprising a first value representing information about a processor capacity utilization associated with the service;
generating second metric data comprising a second value representing information about a memory capacity utilization associated with the service; and
generating third metric data comprising a third value representing information about an input/output operations per second utilization associated with the service.

6. The method of claim 5, further comprising:
determining that at least one of the first value, the second value, or the third value is equal to or greater than a threshold value; and
in response to the at least one of the first value, the second value, or the third value being equal to or greater than a threshold value, determining the hardware cost metric data.

7. The method of claim 1, wherein the optimization of the performance of the hardware includes changing from the first cost to the second cost.

8. The method of claim 1, wherein the threshold data is generated based on a benchmark test configured to determine an amount of sample transactions which causes the at least one of a plurality of metric values to reach the threshold capacity.

9. The method of claim 1 wherein the predicted quantity of transactions is predicted based on at least one of:
a historical analysis of quantities of transactions processed by the service;
an introduction of a new product; or
a planned reduction in price for one or more products.

10. The method of claim 1, further comprising:
generating procurement data based on the optimization data, the procurement data indicative of an amount of additional hardware to be ordered for the service; and
providing the procurement data to a supplier that supplies additional hardware.

11. The method of claim 1, further comprising accessing one or more log files comprising recorded information about activities performed by the service, wherein the throughput data is generated by analyzing the one or more log files.

12. The method of claim 1, wherein the first cost is determined by dividing the expense associated with the hardware by the peak quantity of transactions occurring over the period of time.

13. The method of claim 1, further comprising:
determining one or more business drivers associated with one or more of a plurality of application programming interfaces, wherein the service includes the plurality of application programming interfaces; and
determining prediction data based on the business driver.

14. A system comprising:
a server computing device configured including code that when executed causes the server computing device to:
generate throughput data representative of quantities of transactions processed over a period of time, wherein:
the transactions comprise application programming interface calls; and
the transactions are processed by a service operating on hardware, the service comprising a set of instructions that execute to perform computational tasks;
generate peak data representative of a peak quantity of transactions occurring over the period of time, wherein the peak data is generated based on the throughput data;

access expense data representative of an expense associated with the hardware;

generate hardware cost metric data indicative of a first cost associated with a performance of the hardware, wherein the hardware cost metric data is generated based on the expense data and the peak data;

access prediction data representative of a predicted quantity of transactions to be processed by the service;

generate predicted hardware cost metric data indicative of a second cost comprising a predicted cost associated with the performance of the hardware, wherein the predicted hardware cost metric data is generated based on the hardware cost metric data and the prediction data;

access test data representative of sample quantities of transactions and at least one of the hardware cost metric data reaching a threshold capacity;

generate threshold data indicative of a third cost comprising an optimal cost associated with the performance of the hardware, wherein the threshold data is generated based on the expense data and the test data;

generate business driver data indicating one or more dominant application interface calls comprising one or more of the application interface calls which have more of an impact on the performance of the hardware when compared to other application interface calls;

generate scaling formula data used to determine an amount of hardware consumed for the one or more dominant application interface calls; and generate optimization data representative of an amount of the hardware that changes the first cost to the third cost, wherein the optimization data is generated based on the predicted hardware cost metric data, the threshold data, the business driver data, and the scaling formula data.

15. The system of claim 1, wherein the first cost is generated by dividing the expense associated with the hardware by the peak quantity of transactions occurring over the period of time.

16. The system of claim 1, wherein the server computing device is further configured to:
generate procurement data based on the optimization data, the procurement data indicative of an amount of additional hardware to be ordered for the service; and
provide the procurement data to a computing device executing an order processing service associated with a supplier of additional hardware.

17. A non-transitory computer readable medium storing instructions, which when executed by a processor, cause the processor to perform actions comprising:
generating throughput data representative of quantities of transactions processed over a period of time, wherein the transactions are processed by a service operating on hardware; accessing expense data representative of an expense associated with the hardware;

generating hardware cost metric data indicative of a first cost associated with a performance of the hardware;

accessing threshold data indicative of a second cost, the second cost comprising an optimal cost associated with the performance of the hardware based on determining when at least one of the hardware cost metric data reaches a threshold capacity;

accessing prediction data indicative of a predicted quantity of transactions to be processed by the service;

generating predicted hardware cost metric data indicative of a third cost comprising a predicted cost associated with the performance of the hardware, wherein:
the predicted hardware cost metric data is generated based on the hardware cost metric data and the prediction data; and
generating optimization data comprising information indicating an amount of the hardware that changes the first cost to the second cost, wherein optimization data is generated based on the hardware cost metric data, the threshold data, and the prediction data.

18. The computer readable medium of claim 17, wherein the threshold data is generated based on a benchmark test configured to determine an amount of sample transactions which causes the at least one of a plurality of metric values to reach the threshold capacity.

19. The computer readable medium of claim 17, the actions further comprising generating peak data representative of a peak quantity of transactions occurring over the period of time, wherein:
the throughput data is generated based on the peak data; and
the hardware cost metric data is generated based on the expense data and the peak data.

20. The computer readable medium of claim 17, wherein the predicted quantity of transactions is predicted based on a historical analysis of quantities of transactions processed by the service for the same time of year.

* * * * *